United States Patent
Varma et al.

(10) Patent No.: US 6,564,246 B1
(45) Date of Patent: May 13, 2003

(54) SHARED AND INDEPENDENT VIEWS OF SHARED WORKSPACE FOR REAL-TIME COLLABORATION

(75) Inventors: Pradeep Varma, New Delhi (IN); Suresh Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/241,928

(22) Filed: Feb. 2, 1999

(51) Int. Cl.$^7$ .............................................. G06F 15/16
(52) U.S. Cl. ...................... 709/205; 709/217; 709/248
(58) Field of Search ................ 709/217, 205, 709/219, 223, 203, 243, 244, 248, 294

(56) References Cited

U.S. PATENT DOCUMENTS

| | | | | |
|---|---|---|---|---|
| 5,107,443 A | * | 4/1992 | Smith et al. ................. | 364/419 |
| 5,623,681 A | * | 4/1997 | Rivette et al. .............. | 395/788 |
| 6,119,149 A | * | 9/2000 | Notani ........................ | 709/205 |
| 6,199,101 B1 | * | 3/2001 | Pfaff .......................... | 709/204 |
| 6,230,171 B1 | * | 5/2001 | Pacifici et al. .............. | 707/512 |
| 6,233,600 B1 | * | 5/2001 | Salas et al. ................. | 709/201 |
| 6,289,384 B1 | * | 9/2001 | Whipple et al. ............ | 709/209 |
| 6,334,146 B1 | * | 12/2001 | Parasnis ..................... | 709/217 |

OTHER PUBLICATIONS

Bentley et al., Supporting Collaborative Information Sharing with the World Wide Web: The BSCW shared Workspace System, http://www.w3.org/Conferences/www4/papers/151, pp. 1–13, from 1995.*

Decouchant et al., Structured Cooperative Authoring on the World Wide Web, http://www.w3.org/Conferemces/www4/papers/91, pp. 1–11, from 1995.*

* cited by examiner

Primary Examiner—Glenton B. Burgess
Assistant Examiner—Tod Kupstas
(74) Attorney, Agent, or Firm—Whitham, Curtis & Christofferson, P.C.; T. Rao Coca

(57) ABSTRACT

A synchronous collaboration environment that supports real-time collaboration of multiple participants, each having shared and independent views of the shared workspace. Multiple views per participant are provided. Some of the views seen by a participant can be shared views with the usual common cursor and annotation tools. The shared views need not be homogeneous, which means that for a given view, each participant can see more than just some common data in his or window for the view. What the participant sees separately from the common data can make his or her shared view different from that of other participants. The view can be different due to different data being exposed in the view. Some of the views seen by a participant can be independent views. This allows to the participant synchronous working with the shared workspace alone on his or her own. The collaboration system includes a user interface and support for aligning views including goto and overlaying. Participants can modify the workspace through their views in a synchronized manner provided the sharing and access rights of their views allow them to do so.

29 Claims, 7 Drawing Sheets

SHARED AND INDEPENDENT VIEWS OF SHARED WORKSPACE FOR REAL-TIME COLLABORATION

BACKGROUND OF THE INVENTION

1. Field of the Invention

The present invention generally relates to collaborative work by a plurality of participants using computers connected together via a network and, more particularly, to a real-time collaboration system in which each participant can have multiple views of the shared workspace, the views of the shared workspace of different participants are not necessarily the same or homogeneous and, further, the participants may have independent views of the workspace.

2. Background Description

Software for collaborative work, i.e., work involving many users and/or agents falls into two categories of use. One is termed asynchronous collaboration and the other, synchronous collaboration. Examples of software for asynchronous collaboration are groupware such as Lotus Notes and Microsoft Exchange. These along with other examples such as discussion groups where data is changed batchwise have the characteristic that neither do they require, nor do they particularly cater to the concurrent presence of many users and agents in the work environment. The work environment can include all users and agents that use computers that are connected to each other by networks such as the Internet or intranets. In contrast to software for asynchronous collaboration, software for synchronous collaboration is designed to cater to concurrent users and agents. It includes collaboration tools such as chat, concurrent whiteboards and the more sophisticated Same Time environment. These tools provide for real-time interaction among groups using the same shared workspace. Whatever be the workspace—document, spreadsheet, CAD drawing, etc.—it can be seen and modified by the collaborators, simultaneously. Modifications to the workspace are made available to all group members, immediately and synchronously.

Commonly available synchronous collaboration tools place significant restrictions on the kind of shared workspaces. Chat programs operate on text files and concurrent whiteboards operate of shared bitmap images. If a team of users wants to synchronously update, say, a spreadsheet using a concurrent whiteboard, then the team members have to individually update their local spreadsheet copies while staying in synchrony using images of the spreadsheet shared through the whiteboard. The ability to share a larger variety of workspaces than text files and bitmap images, and the ability to view and edit them using their native applications, i.e., collaborate by application sharing, has only recently become available. However, this ability comes with the restriction that all participants are allowed basically the same, shared view of the workspace. In some cases this commonality of view is described as WYSIWIS, i.e., What You See Is What I See. This restriction overlooks the need that effective collaboration may require individual users to have a plurality of views of widely different characteristics for both seeing and editing the synchronous, shared workspace.

SUMMARY OF THE INVENTION

Effective real-time collaboration among possibly widely dispersed participants requires making a multiplicity of different views of the shared workspace available to individual participants. In the invention disclosed herein, multiple views per participant are provided. Each view can be shared between a different subset of the participants. The subset can be a singleton set, which means that the view can be an independent view—the participant with such a view can work with the synchronous workspace, alone or on his own. Within any set of participants sharing a view, the data seen through the view need not be identical for each participant. Since the view need not be homogeneous, i.e., it can be heterogeneous, then beyond some common data each participant can see different data through the view. The invention provides a user interface for the multiple views it supports and for their control. The interface includes a separate/shared window for each view, bookmarks for views, and control buttons/inputs. The invention provides support by which participants can align their views by, say, using a "GOTO" command from one view to another, or by overlaying one view on another. Participants can modify the workspace through views in synchronized manner provided that the sharing and access rights of the views allow them to do so. Sharing and access rights, and the authority to change other's rights can be changed dynamically.

The invention provides a means for carrying out synchronous collaboration wherein collaboration participants are individually allowed a variety of views of the shared workspace. The invention includes a user interface for viewing. For simplicity, one participant per client or collaboration software frontend process running on a user's machine is assumed in this introduction section. In this invention, participants of a collaboration session can choose to have any number of shared, synchronous views of a shared workspace wherein each view has more than one viewer sharing the view and each viewer has his own separate client for accessing the workspace (see assumption above). The number of such views can be zero, which means that the participants have at most either shared, synchronous views of a solitary viewer each or only independent, synchronous views of the shared workspace.

Each individual participant can see a shared view of the workspace in a separate window in his client. The shared view can be seen by participants in a homogeneous manner. In a homogeneous presentation, each participant sees the same portion of the workspace that other participants sharing the view see. The display characteristics, e.g., scale, font syntax can be different, but the data exposed in each participant's window is the same. In a heterogeneous presentation each participant sees some data that is required to be common for all participants sharing the view. In addition, each participant can also see data that is not required to be common for all participants. The data that is required to be common can be delineated from other data by, say, a surrounding bounding box. Thus, for example, viewers can be sharing a text document in which the common data everyone is looking at is a paragraph. Some viewers can be seeing just the paragraph in their shared windows. Some viewers can be seeing the paragraph and some text lying below it. Some viewers can be seeing the paragraph and text above it. Other viewers can be seeing other combinations of the paragraph and text.

The display characteristics (syntactic characteristics) of each viewer's heterogeneous shared window can be different. Within the common region of a shared view (e.g., the delineated region of a heterogeneous shared window and the entire region lying within a homogeneous shared window), the usual tools of shared manipulation are available. For example, participants can manipulate a shared cursor in this region and annotate/select portions of the region. All such changes are synchronized as usual and are made available in the window for the shared view of each participant. The invention provides support for participants to form interest groups for carrying out synchronous collaboration in different parts of the shared workspace. The interest groups operate on the shared workspace concurrently, as a part of the total synchronous collaboration involving all participants. Participants in an interest group can form, say, one shared view for themselves, and the windows for the view are made available within the membership of the interest group only. Support for forming interest groups, for having shared views per interest group, for dynamically starting and/or discontinuing any interest group, for dynamically changing the members comprising any interest group, for dynamically blocking out dynamic changes in the membership of any interest group, for keeping interest groups anonymous, and for keeping the presence of any interest group unknown outside its membership is provided by the invention in order to increase the flexibility of synchronous collaboration.

The invention supports interest groups comprised of only one member. Support for such interest groups includes all the shared views supported for interest groups of larger memberships. One particular kind of a view supported for such interest groups is an independent view. An independent view is an unknown shared view associated with an interest group which has an unchanging membership of one participant only. Independent views of a shared workspace exist in concurrence with any other shared views of the shared workspace. This allows to a participant working on the shared workspace independently, as for example in a slide show wherein a participant may want to see something on a previous slide without dragging the entire group with him, and yet not losing the synchrony of real-time collaboration. For example, consider collaborative development wherein a specialist may be required to incorporate group suggestions into a workspace immediately, and without restricting the group to watching him work. The specialist can work using an independent view. FIG. 2 shows a collaboration containing an independent view along with a shared, heterogeneous view.

Each of the multiple independent views available to a participant can be presented to him in a separate window. As an option, the position of each view is available to him as a bookmark and he can shift from view to view within the same window. The participant can use this option in the context of shared views also to reduce the number of windows available to him at any time. Participants can generate bookmarks for the purpose of keeping track of views/positions in the shared workspace that are of interest to them.

The invention supports various ways of aligning views so as to allow the transfer of views from audience to audience. For example, in order to allow a participant to bring to the notice of a larger audience the view contained in his independent window, the invention provides support for any participant to take control of an ordinary, shared view and use a "GOTO" command to make it overlap with an independent view. The "GOTO" command can be used to make an independent view coincide with an ordinary, shared view also. Any view can be used to start off another view of the workspace. The new view can be an ordinary, shared view or an independent view. The initial value of the new view is the same as that for the view starting it off. An independent view can be overlaid on top of an ordinary, shared view. In this case, the independent view will coincide with the shared view, and shifts in the shared view will be reflected in the independent view identically until the overlaying of the independent view is turned off. Similarly, an ordinary, shared view can be overlaid on an independent view. The shared view will then reflect the independent view whenever the overlaying is on. Both the "GOTO" command and overlaying can be provided to participants as a button, icon, graphical object, keyboard input or some combination thereof.

The invention supports specific access and sharing rights for each participant. For any participant, the rights can be different for each of the workspace views/interest groups available to him. The access rights include read only, and read and write. Sharing rights of a participant for a view or interest group indicate which participants, including himself or herself, the participant can add or remove from the view or interest group. When a participant has only read rights to a shared view, then he cannot add/delete data through that view. At most he can pass his comments on the view to others by manipulating the shared cursor and/or by selecting from-the common data contained in the view. Selected data, if any, is highlighted as usual for all participants sharing the view. Access and sharing rights of any participant can be defined/changed on an individual view or interest group basis or a multiple view or interest group basis. For a participant, the rights can be changed in agreement with the participant, or independently of the participant. The authority to change the access rights of others can be vested in a subset of the collaboration participants. This subset can be changed dynamically. For example, in the case of an interest group, the authority can be delegated to the person in charge of actually running the interest group. The authority can be withdrawn when the interest group is wound up, or whenever it is necessitated earlier. Such authority can be delegated or withdrawn in agreement with the recipient(s) of the authority, or independently of the recipient(s).

It is therefore an object of the present invention to provide computer software which supports real-time collaboration of multiple participants, each having shared and independent views of the shared workspace.

According to the invention, there is provided effective real-time synchronous collaboration among possibly widely dispersed participants by making a multiplicity of different views of the shared workspace available to individual participants. Multiple views per participant are provided. Some of the views seen by a participant can be shared views with the usual common cursor and annotation tools. The shared views need not be homogeneous, which means that for a given view, each participant can see more than just some common data in his or window for the view. What the participant sees separately from the common data can make his or her shared view different from that of other participants. Of course, the participant's view can be different due to a syntactically different display of data, but more fundamentally, the view can be different due to different data being exposed in the view. Some of the views seen by a participant can be independent views. This allows to the participant synchronous working with the shared workspace alone on his or her own. Participants can modify the workspace through their views in a synchronized manner provided the sharing and access rights of their views allow them to do so.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
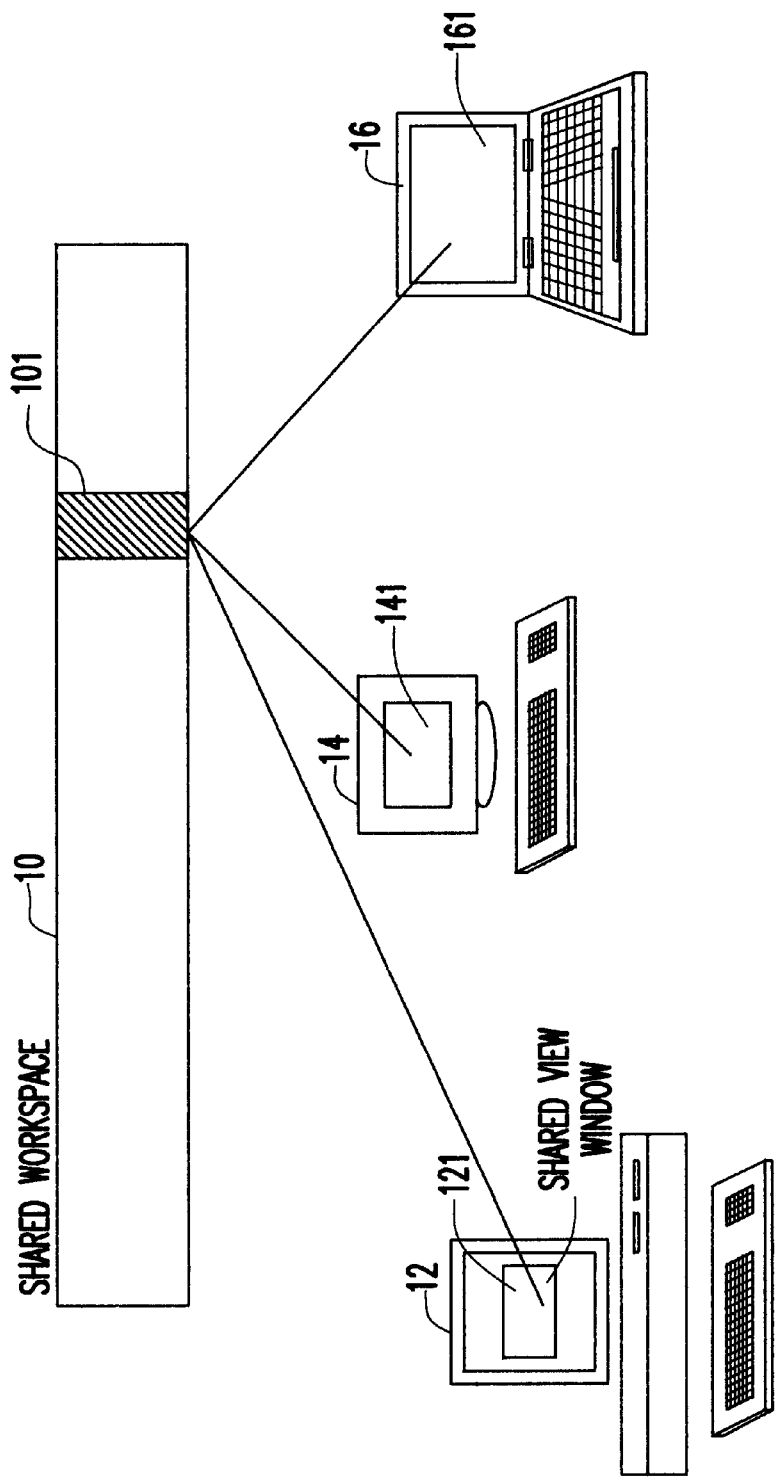
FIG. 1 is an illustration of the prior art in which a plurality of participants work synchronously in a shared workspace.

The invention is a real-time collaboration system that builds on conventional technology available for application-sharing-based, real-time-collaboration systems. Conventional technology for any application-sharing-based, real-time-collaboration system is generally comprised of:

1. A means for generating a set of frontend processes (clients) for any session of real-time collaboration supported by the system. In any such session, the session's clients provide synchronous access to the session's shared workspace to the participants of the session. The client processes rely on the single-user, noncollaborative, software application that is ordinarily used to access the workspace in a natural (i.e., sequential, isolated, noncollaborative) manner. Each client may support one or more different kinds of workspaces. The real-time-collaboration system may generate more than one kind of a client. Thus, the set of workspace kinds supported by the collaboration system is the union of the sets of workspace kinds supported by all the different kinds of clients generated by the system. When any client makes a shared workspace available to a participant, then it can make the workspace accessible through a window running the software application that is natural to the workspace.

2. A means for generating a serializing mechanism for any real-time-collaboration session supported by the system. From each client of any such collaboration session, the session's serializing mechanism takes as input a sequence of workspace modifications generated by the client. To all clients in the collaboration session, the serializing mechanism makes available one stream of serialized workspace modifications based on the input modification sequences received from the clients. The serialized modification stream comprises an interleaving of the sequences of modifications sent by the clients. The serializing mechanism can be server based, say, centralized-server based, or it can be based on peer-to-peer messaging.

3. A means for generating a communication mechanism for any real-time-collaboration session supported by the system. For any such session, each client in the session is provided with a means for communicating a sequence of modifications to the serializing mechanism of the session. The client is also provided a means for receiving serialized modifications from the serializing mechanism.

Any client as described in I above can support the formation of a modification by any participant using the client. The modification formation occurs in the context of a workspace state that can change while the modification is being formed. This can happen due to the arrival of a serialized modification. The client presents a reasonably up-to-date view of the workspace to the participant based on the serialized modifications received by the client. In modification formation, the client can let the participant see the potential effect of his modification on the workspace while the modification is in formation. The effect may not be the effect that is finally generated by the modification because unseen serialized modifications can end up preceding the modification in the serialized stream of modifications.

Our invention, a real-time collaboration system, builds on the conventional technology above by developing further the technology for clients (see 1 above). The invention supports the display of multiple views by each client. The views displayed by one client can differ from the views displayed by another client. In modifying a workspace, a view provides a context for modification, just as a file pointer does in modifying a file. Each client in our system maintains a separate copy of the synchronous workspace. The copies of the workspace, one per client, are kept in synchrony by ensuring that the initial copies of the workspace, prior to collaboration, are the same, and that the stream of serialized modifications for each workspace copy is the same. Each modification in our system is tagged by the identity of the view in which the modification was created. When a client receives the modification in the stream of serialized modifications, the client uses the tag to identify the context in which the modification changes the client's copy of the synchronous workspace. The context, just like a file pointer, is needed in order for the modification to be incorporated in the client's workspace copy. Each client thus maintains all possible contexts that can be identified by serialized modifications. Since serialized modifications can be generated by views not displayed by the client, the client may have to keep contexts corresponding to views displayed by other clients also and not just those for views displayed by itself.

Shared state corresponding to view contexts, interest groups and collaboration status is also maintained as a separate copy in each client. Synchrony among such state copies is maintained in a manner analogous to workspace copies by modifying the state copies only through the use of serialized modifications. An interest group is a set of clients, which can be implemented as a list of client identities. Each view has associated with itself exactly one interest group. The view is shared (e.g., displayed, modified through the view) by only the members of the interest group. Interest groups can be created, discontinued, changed, or made impervious to change by serialized modifications. The view associated with an interest group is changed in accordance and in synchrony with the interest group. Thus, when a member is added to an interest group, then the member also starts sharing any views associated with the interest group, when a member is removed from an interest group, then the member also stops sharing any views associated with the interest group, etc. While any view exists only in concurrence with an associated interest group, an interest group can exist without any views associated with it. Such as interest group can be changed using serialized modifications without affecting any view in the process. A view can be associated with an interest group or disassociated from an interest group dynamically by using a serialized modification. If a view is disassociated from an interest group and not associated with another interest group by the same serialized modification, then the view gets deleted by the serialized modification. A view can be created or deleted dynamically by a serialized modification. The creation of a view requires the identification of an associated interest group. Either the interest group can be in existence prior to the processing of the serialized modification which creates the view, or it has to be created by the serialized modification itself. When a view is deleted, then either the interest group associated with the view is also deleted, or the interest group is not deleted. The choice is specified as a part of the serialized modification that deletes the view. If a view is deleted along with the interest group associated with the view, then all the other views associated with the interest group also get deleted at the same time. The authorization to force an interest group deletion may not be present with a serialized modification (see also, discussion later). In this case, if the serialized modification aims at a view deletion along with an interest group deletion, then the serialized modification can only effect view deletion at most.

The entire copy of shared state corresponding to interest group and collaboration status, etc. available with a client is not made available by the client to the user(s) accessing the client. This is because interest groups support the declaration of anonymity and invisibility by their members. When an interest group is declared to be anonymous by its members, then its membership is not allowed to be displayed by clients that are not a part of the interest group. In other words, users who do not belong to an anonymous interest group are not to be told by their clients about the identity of those belonging to the interest group. When an interest group is declared to be invisible by its members, then even the existence of the interest group (e.g., status) is not allowed to be displayed by clients which are not a part of the interest group. An invisible interest group is also called an unknown interest group.

An independent view is an unknown shared view associated with an interest group which has an unchanging membership of one client only. Independent views have special support for their creation, deletion and manipulation defined in the user interface (see later) for our real-time-collaboration system. Such special support includes buttons, icons and keyboard input that enables an independent view to be handled as an entity in itself, instead of dealing with the view in terms of its definition as a certain unknown view at every time. The special support in effect provides macros or short forms for dealing with independent views. The interface also displays the status of an independent view in a separate manner in its client.

A modification tagged by a heterogeneous view also carries as part of its tag the identity of the client which generates the modification. Since a heterogeneous view varies from client to client, the identification of the context of a modification generated in a heterogeneous view can be carried out by identifying the client along with the heterogeneous view for the modification. For a homogeneous view, there is no need to tag a modification with the identity of the client from which the modification originates.

Our collaboration system supports various ways of aligning views. One way of aligning two views is to make the views overlap each other. Either view can be made to overlap with the other, say the beginning of one of the views is made to be the same as the beginning of the other, by use of a "GOTO" command. The "GOTO" command creates a modification, which after it is processed as a serialized modification by a client, makes the client overlap the view indicated in the command. A simple way of making views overlap that is relatively workspace independent is to compare bitmap or other images of the views, moving one view until it coincides with the other.

Another kind of alignment among views supported by our collaboration system is to use one view to start off another view of the workspace. At least initially, the beginning of the new view coincides with the beginning of the view starting it off. A simple way of implementing such start off is to reuse support for the "GOTO" command, by packing a "GOTO" command in the view creation modification, whereby the newly-created view is made to overlap with the view starting it off.

One view can be overlaid on top of another by which the overlaid view is made to coincide with the other view (say the beginnings of the views will coincide). The other view is called the lead view. Shifts in the lead view, e.g., scrolling, are reflected in the overlaid view identically until the overlaying is turned off. The turning on of overlaying is packed in a modification. Similarly, turning off of overlaying is packed in a modification. Serialized modifications processed by a client in between a serialized modification that only turns overlaying on and a serialized modification that only turns overlaying off such that no other conflicting, serialized overlaying on/off modification intervenes between the two are processed in a manner in which the client does not end up losing the alignment between the overlaid view and the lead view. Assuming that both the lead view and overlaid view remains defined (e.g., undeleted) during this time, this processing is equivalent in functionality to the following transform: For each serialized modification between the serialized overlaying-on modification and the serialized overlaying-off modification, a "GOTO" command modification is inserted adjacent to and after the serialized modification in the serialized stream of modifications wherein each "GOTO" command modification makes the overlaid view overlap with the lead view.

Our collaboration system supports specific sharing and access rights for each client. For any client, the rights can be different for each of the workspace views available to it. The access rights include read only, and read and write. Sharing rights of a client for a view or interest group indicate which clients, including itself, the client can add or remove from the view or interest group by sending modifications for the purpose. When a client has only read right to a shared view, then the client cannot modify the workspace through that view. At most, the client can be used to pass comments to others by manipulating the shared cursor and/or by selecting the data contained in the view. Selected data, if any, is highlighted as usual in every client sharing the view and the data after the client receives serialized modifications for highlighting data. Access and sharing rights of any client can be defined/changed on an individual view or interest group basis or a multiple view or interest group basis using serialized modifications. For a client, the rights can be changed in agreement with the client or independently of the client. The authority to change the access rights of others can be vested in a subset of the clients. This subset can be changed dynamically using serialized modifications. For example, in the case of an interest group, the authority can be delegated to the client in charge of actually running the interest group. The authority can be withdrawn when the interest group is wound up, or whenever it is necessitated, earlier. Such authority can be delegated or withdrawn in agreement with the recipient(s) of the authority, or independently of the recipient(s).

The user interface for our collaboration system supports the presentation of each view shared by a client by a separate window for the view in the client. Each window can at most be based on a separate invocation or process instantiation of the software application natural to the non-collaborative use of the workspace. Modifications made through any such window have to be intercepted as usual and sent for serialization before they can be allowed to modify the central client's copy of the shared workspace. The central copy of the workspace can be modified by only serialized modifications. A simple, comprehensive way of modifying the centralized workspace copy of a client according to a tagged serialized modification is to recreate and use the entire view identified by the tag in the client—create the window for the view in the client, and then modify the workspace using that window. For a view not shown in the client, such a window has to be kept out of the sight of the user of the client. Thus, for each serialized, tagged modification received by the client in its stream of serialized modification, the client can end up creating or retrieving from the background (foreground if the window is visible in the client) a window for the tag of the modification, updating the central workspace copy using the window and the modification, updating other shared state of the client such as interest groups, collaboration status, and view contexts, shutting down or putting in the background or elsewhere, the window for the modification, and then refreshing all windows for views visible in the client.

For heterogeneous views, the user interface includes the option of delineating the common data in the view. This can be done by selecting the common region in the view, or by drawing a bounding polygon along the perimeter of the common region by manipulating the image for the common region. The user interface supports the presentation of any view as a bookmark in a client, wherein the bookmark can be an icon for the window containing the view. The bookmark can use standard iconifying procedures used in the windowing system available to the collaboration system. Multiple bookmarks can be identified as sharing one window. In this case, all the bookmarks remain as icons with at most only one exception at any time. The exception can be available as a window at that time. When another bookmark is identified to be seen as a window, the exception is returned to an icon state in order for the other bookmark to be opened up as a window. The status of collaboration and other shared state visible in a client can be displayed on a status display bar in the client. Control of the user interface and the rest of the collaboration system including user input for workspace modifications can take the form of keyboard input, control input sequences, events over buttons, icons and graphical objects, etc.

Referring now to the drawings, and more particularly to FIG. 1, there is shown a prior art representation of a synchronous collaboration designed to cater to concurrent users and agents. The shared workspace 10 may be a document, spreadsheet, slide show, drawing, or the like. The participants may be using a variety of computers, such as a personal computer (PC) 12, a workstation 14 or a laptop computer 16. The computers may be interconnected by an intranet, such as a local area network (LAN) or wide area network (WAN), or the Internet or a combination of intranet and the Internet. For example, the PC 12 and the workstation 14 might be connected to an intranet while the laptop computer 16 is connected through the Internet.

Whatever the workspace 10, the participants in the collaborative work have a homogeneous shared view of the workspace. The shared view is represented as 121 on the screen of the PC 12, as 141 on the screen of the workstation 14 and as 161 on the screen of the laptop computer 16. The shared view is derived from the same data in the workspace, here designated as 101. This shared view of the workspace can both be seen and modified by the several collaborators, simultaneously. This is made possible by available synchronous collaboration tools such as chat programs and concurrent whiteboards which operate on text files and bitmap images, respectively.

The present invention provides a means for carrying out synchronous collaboration in which collaboration participants are individually allowed a variety of views of their shared workspace. In this invention, as generally illustrated in FIG. 2, participants of a collaboration can choose to have any number of independent and/or shared views of a shared workspace.

Figure 2:
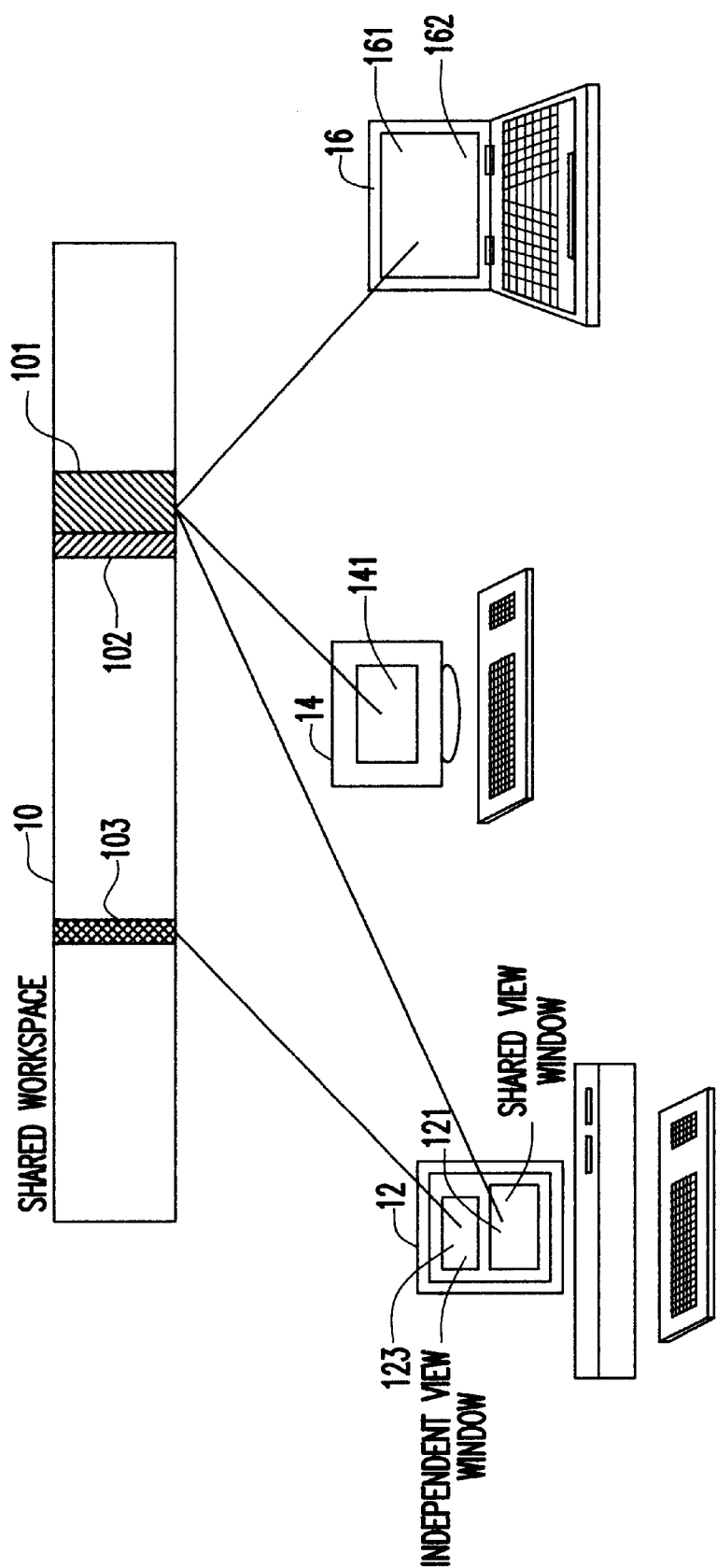
FIG. 2 is an illustration of a synchronous collaboration in which the participants have both shared and independent windows according to the invention.

FIG. 2 shows the same general arrangement as in FIG. 1 in which the screens of the several computers have a heterogeneous shared view window 121, 141 and 161, all including the same data 101 of the workspace 10 as before. In this case, however, the window 161 of the laptop computer displays an extra region which presents data 102 contiguous with data 101. In the case illustrated, the data 102 precedes data 101 so, for example, if the workspace 10 is a text document, the data 102 displayed in region 162 would be text that immediately precedes the common text in window 161. Also, the screen of the PC 12 has a separate, independent window 123 which displays data 103 from the shared workspace 10. This data, however, is riot displayed on any other screen of the computers of the several participants.

Thus, in FIG. 2, each individual participant sees a shared view of the workspace in a separate window 121, 141 and 161. However, unlike the prior art illustrated in FIG. 1, this shared view is seen by participants in a heterogeneous manner. Homogeneous views are supported in a homogeneous presentation, each participant sees the same portion of the workspace that other participants see, as in the prior art. The display characteristics (e.g., scale, font syntax, etc.), can be different, but the data exposed in each participant's window is the same. In a heterogeneous presentation, each participant sees some data that is required to be common for all participants. In addition, each participant can also see data that is not required to be common for all participants. The data that is required to be common can be delineated from other data by, for example, a surrounding bounding box. Thus, for example, viewers can be sharing a text document in which the common data everyone is looking at is a paragraph. Some viewers can be seeing just the paragraph in their shared windows as represented in FIG. 2, for example, by the workstation 14. Some viewers can be seeing the paragraph and some text lying below it. Some viewers can be seeing the paragraph and text above it as represented in FIG. 2, for example, by the laptop computer 16.

Figure 3:
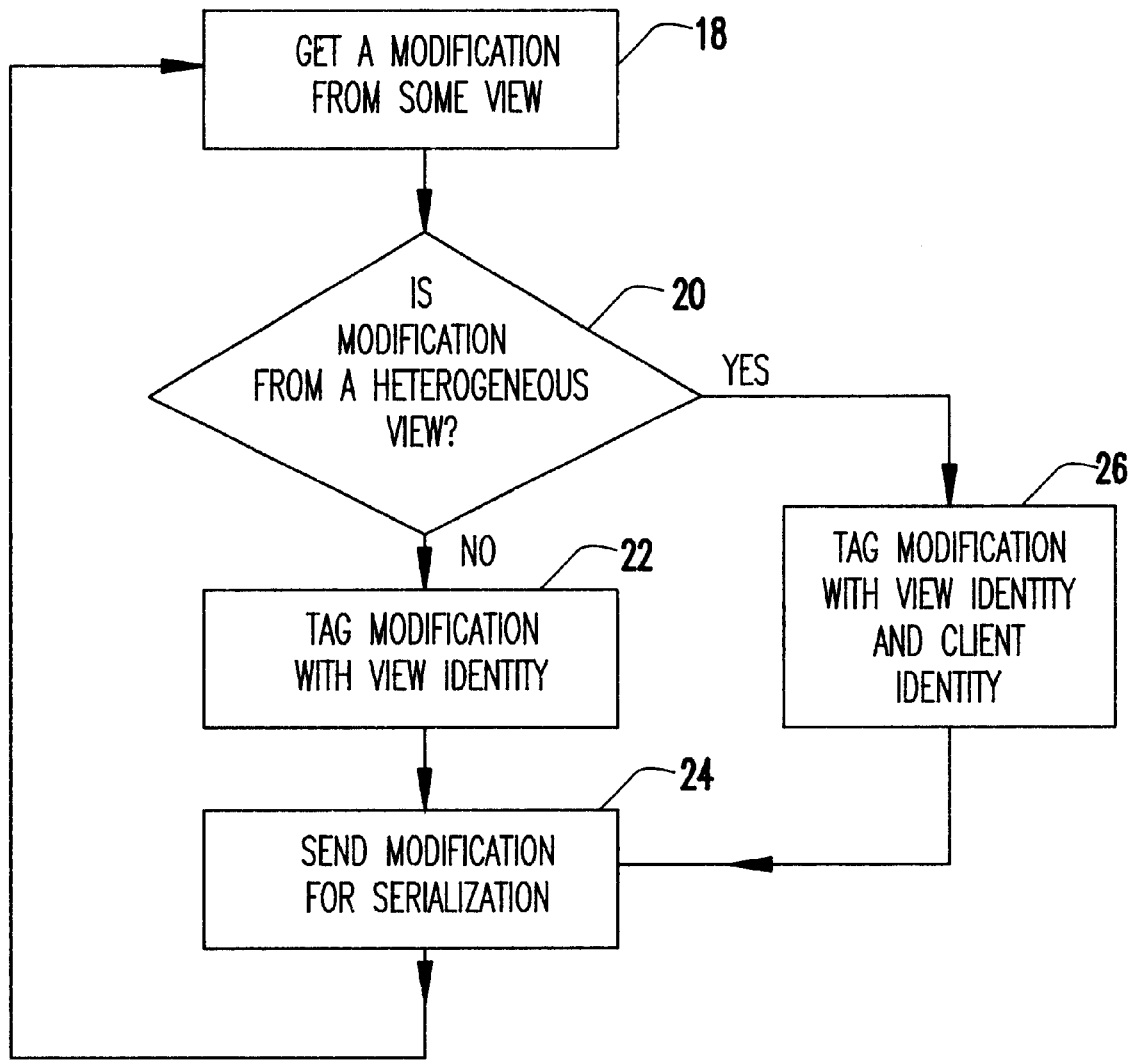
FIG. 3 is an illustration of the process of sending a modification made by a client for serialization.

FIG. 3 shows the process of sending of modifications by a client for serialization. A modification from some view is obtained in function block 18, and a determination is made whether the view is heterogeneous in decision block 20. If so, the modification is tagged with view identity and client identity in function block 26, and the modification is sent for serialization in function block 24. If the view is not heterogeneous, as determined in decision block 20, the modification is tagged with the view identity in function block 22, and then sent for serialization in function block 24.

Figure 4:
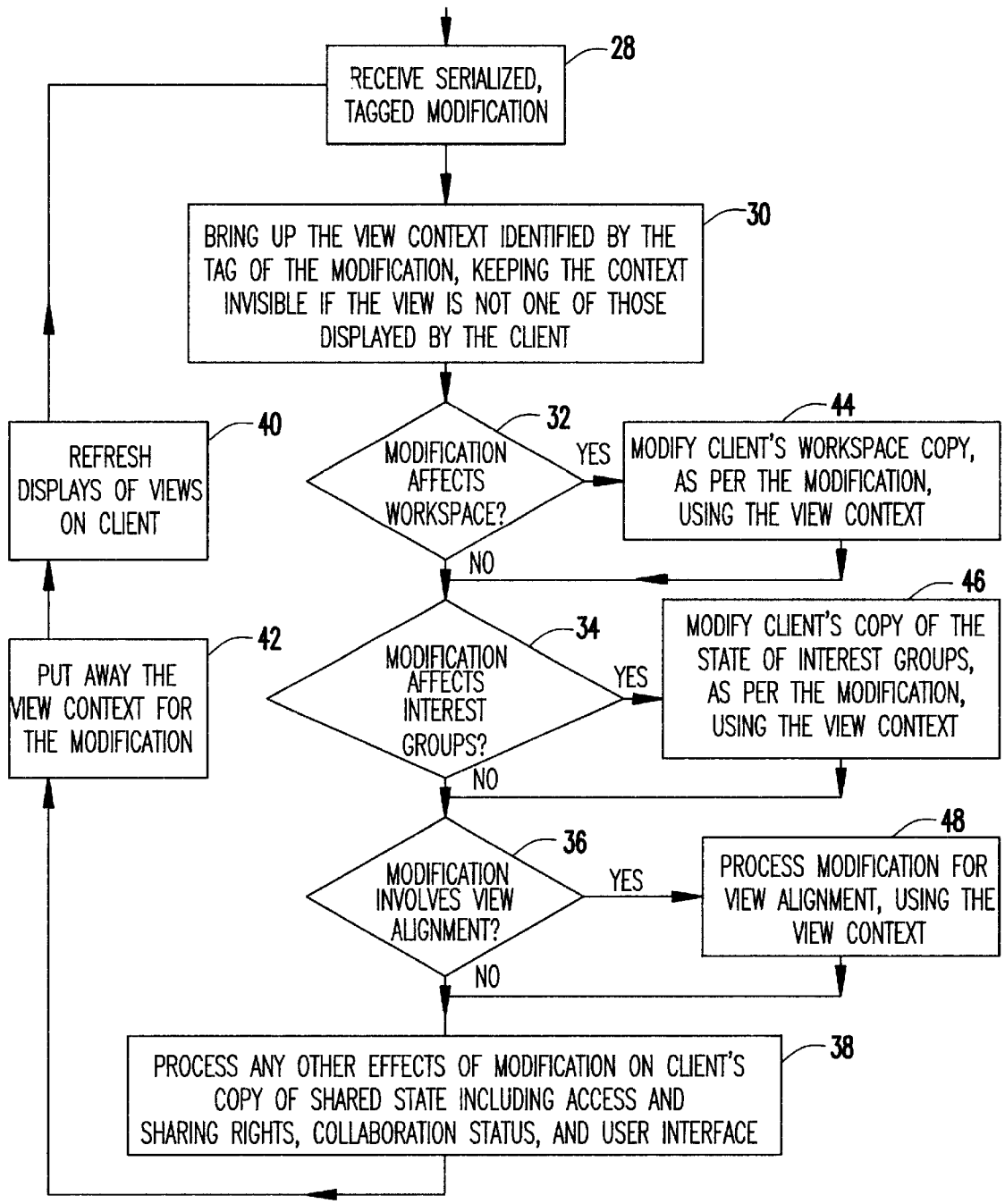
FIG. 4 is an illustration of how serialized modifications are processed by a client.

FIG. 4 shows how serialized modifications are processed by a client. A serialized, tagged modification is received in function block 28. The view context is brought up as identified by the tag of the modification in function block 30. The context is kept invisible if the view is not one of those displayed by the client in function block 30. A test is made to determine whether the modification affects the workspace in decision block 32. If yes, then the client's workspace is modified using the view context in function block 44. Then, or if the test in decision block 32 had yielded no, a test is made to determine whether the modification affects interest groups in decision block 34. If yes, the client's copy of the state of interest groups is modified using the view context in function block 46. Then, or if the test in decision block 34 had yielded no, a test is made to determine whether the modification involves view alignment in decision block 36. If yes, then the process modification is processed for view alignment using the view context in function block 48. Then, or if the test in decision block 36 had yielded no, other effects of modification are processed in function block 38 on the client's copy of the shared state, including access and sharing rights, collaboration status, and user interface. The view context for the modification is put away in function block 42. The clients' views are then refreshed in function block 40.

Figure 5:
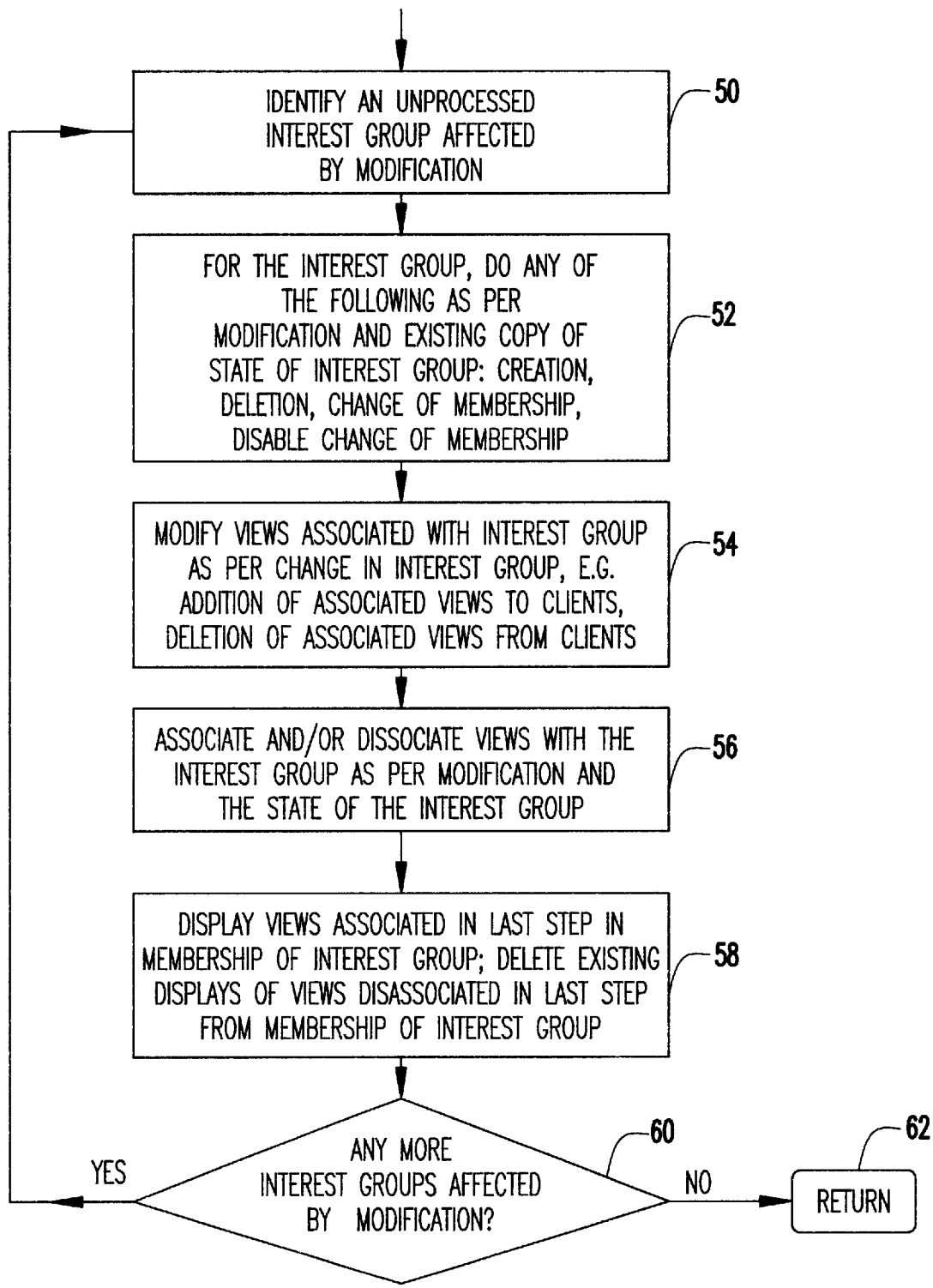
FIG. 5 is an illustration that describes the processing of a serialized modification for changing interest groups by a client.

FIG. 5 shows the processing of a serialized modification for changing interest groups by a client. An unprocessed interest group affected by the modification is identified in function block 50. In accordance with the modification and existing state, the interest group gets created, deleted, has its membership changed, or gets modified so that it disallows changes in its membership in function block 52. Views associated with the interest group are then modified in function block 54 corresponding to changes in the interest group such as changed membership, etc. Next, views are associated or disassociated with the interest group, in accordance with the modification and current state of the interest group in function block 56. In function block 58, views associated in function block 56 are displayed, and existing displays of views associated in function block 56 are deleted. A test is made in decision block 60 to determine if any more interest groups are affected by the modification. If yes, then the process starts over at function block 50. If no, the process returns at 62.

Figure 6A:
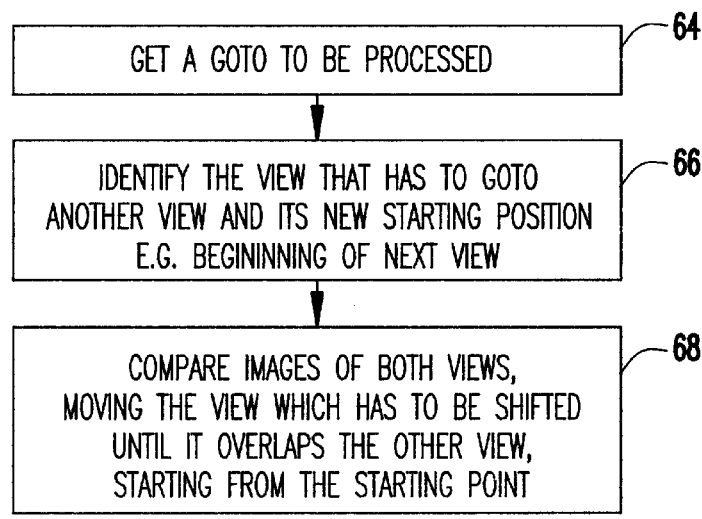
FIG. 6A is an illustration that describes the processing of alignment among views by clients.

FIG. 6A shows how a "GOTO" command is processed. A "GOTO" command to be processed is obtained in function block 64. The view that has to go to another view and its new starting position (e.g., the beginning of the next view) is identified in function block 66. The images of both views are compared, and the view which has to be shifted so that it overlaps with the other view is moved in function block 68.

Figure 6B:
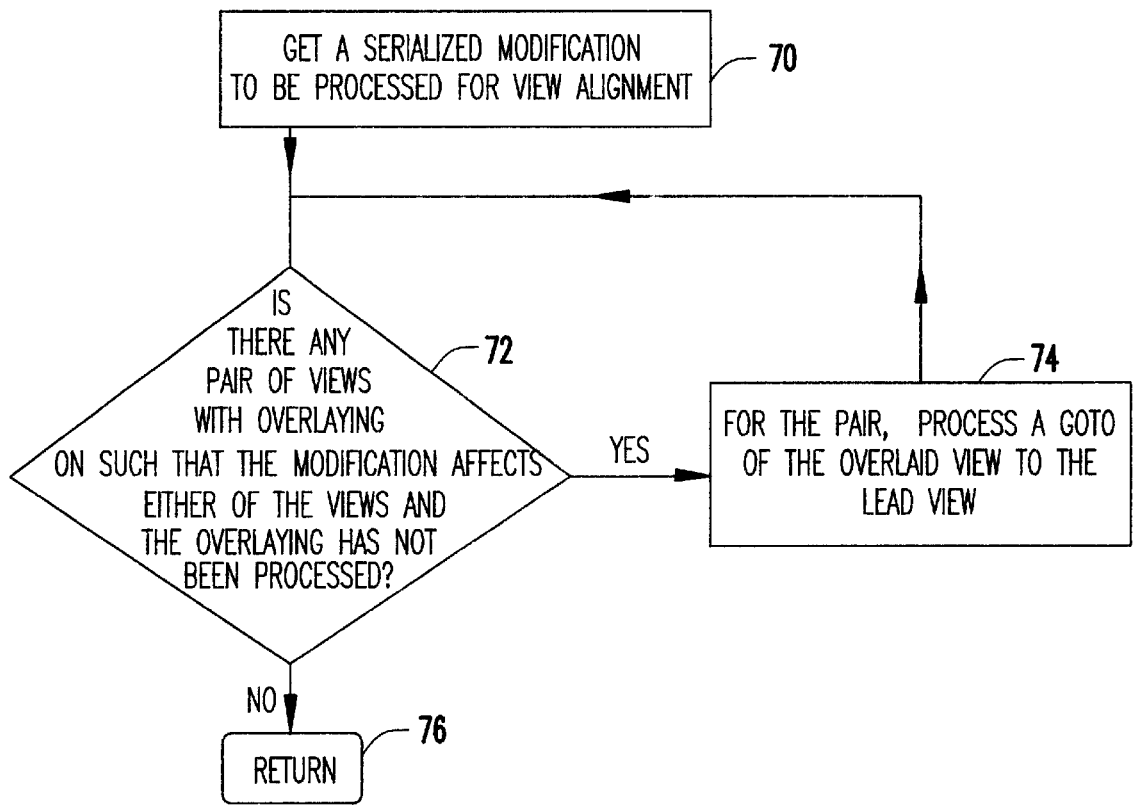
FIG. 6B is an illustration processing a serialized modification for overlaying alignment.

FIG. 6B shows how a serialized modification is processed for overlaying. A serialized modification to be processed for view alignment is obtained in function block 70. A determination of whether any pair of views with overlaying on such that the modification affects either of the views and the overlaying has not been processed is made in decision block 72. If the determination is yes, then for the pair of views, a "GOTO" command is processed of the overlaid view to the lead view in function block 74. Then the process loops back to make another determination in decision block 72. If the determination is no, then the process returns at 76.

Figure 7:
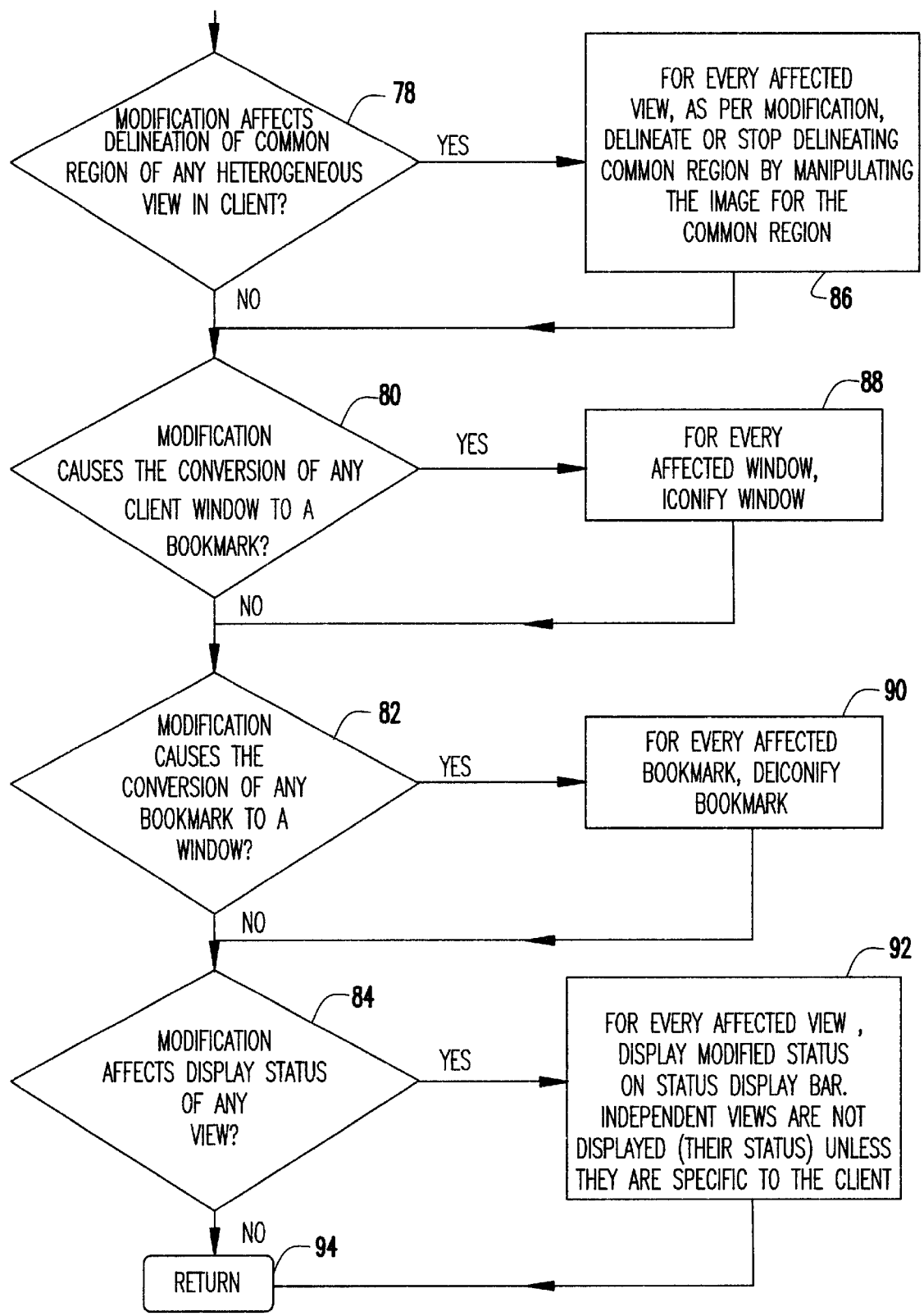
FIG. 7 is an illustration of processing effects of a serialized modification on user interface including a common region in heterogeneous views, bookmarks, and status of views.

FIG. 7 shows the processing of effects of a serialized modification on the user interface-on the common region in heterogeneous views, bookmarks, and states of views. A determination is made in decision block 78 as to whether the modification affects delineation of a common region of any heterogeneous views in the client. Only if the determination is yes, then for every affected view, in accordance with the modification, the common region is delineated, or delineation of the common region is stopped in function block 86. Next, a test is made in decision block 80 as to whether the modification causes the conversion of any client window to a bookmark. Only if the test yields yes, then every affected window is iconified in function block 88. A test is then made in decision block 82 as to whether the modification causes the conversion of any bookmark to a window. Only if the test yields yes, then every affected bookmark is deiconified in function block 90. A test is then made in decision block 84 as to whether the modification affects the display status of any view. Only if the test yields yes, then the status of every modified view is displayed on the display bar in function block 92. The status of independent views is not displayed unless they are specific to the client in function block 92. The process then returns at 94.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented process which provides a synchronous, real-time collaboration environment in which multiple and possibly independent views of a common workspace are allowed to each participant, said process comprising the steps of:

establishing a set of clients for any session of real-time collaboration, wherein said clients provide synchronous access to a shared workspace of said session, support one or more said workspaces, and make one or more synchronous views of said shared workspace available to individual participants;

verifying that initial copies of said workspace for each said client prior to collaboration are the same;

serializing workspace modifications generated by said clients, wherein each said workspace modification is tagged by the identity of a view associated with a client interest group including a said individual participant in which said workspace modification was created and serialization is based on input modification sequences received from said clients;

communicating to said clients said serialized workspace modifications, including client interest group status;

updating each said client's shared workspace, wherein each said client's said workspace is a synchronous copy; and ensuring that the stream of serialized modifications for each said workspace copy is the same.

2. A method according to claim 1, which further comprises dynamically creating and deleting said views.

3. A method according to claim 1, which further comprises dynamically creating and discontinuing one or more said client interest groups, each said interest group being a subset of all said clients in said session.

4. A method according to claim 3, which further comprises dynamically adding said clients to and deleting said clients from said interest group.

5. A method according to claim 3, which further comprises blocking the addition and deletion of any said client to said interest group.

6. A method according to claim 3, which further comprises enabling membership of said interest group to remain anonymous to other said clients that are not members of said interest group.

7. A method according to claim 3, which further comprises enabling said interest group to remain unknown to other said clients that are not members of said interest group.

8. A method according to claim 3, which further comprises associating each said view with a said interest group.

9. A method according to claim 3, which further comprises enabling only one said client to belong to said interest group for the duration of said interest group.

10. A method according to claim 1, which further comprises enabling each said view for each client to contain data common to all said clients sharing the view and client-specific data.

11. A method according to claim 1, which further comprises enabling any of said views to contain the same data for all said clients that are viewing said view.

12. A method according to claim 10, which further comprises enabling each said client to align their views, by using a goto or equivalent command, from one view to another, or by overlaying one view on another.

13. A method according to claim 1, which further comprises enabling one said view to overlap with an other said view, such that when one said view is overlaid on another said view, said overlaid view follows and coincides with said view over which it is overlaid.

14. A method according to claim 2, which further comprises utilizing an existing said view as the initial position for a newly-created view.

15. A method according to claim 1, which further comprises providing specific sharing and access rights for each said view and/or interest group of each said client, said specific access rights including read-only, and read and write, said specific sharing rights including ability to add or remove any client from any said interest group.

16. A method according to claim 15, which further comprises enabling said access rights to be statically or dynamically defined or changed on an individual view basis.

17. A method according to claim 15, which further comprises enabling said sharing and said access rights to be statically or dynamically defined or changed on a multiple view and/or interest group basis.

18. A method according to claim 16, which further comprises enabling said access rights for a particular said client to be changed by said particular client, or independently of said particular client.

19. A method according to claim 17, which further comprises enabling said sharing and said access rights for a particular said client to be changed by said particular client, or independently of said particular client.

20. A method according to claim 16, which further comprises enabling a subset of said clients to change said sharing and said access rights.

21. A method according to claim 17, which further comprises enabling a subset of said clients to change said sharing and said access rights.

22. A method according to claim 20, which further comprises enabling said subset of said clients to change dynamically.

23. A method according to claim 21, which further comprises enabling said subset of said clients to change dynamically.

24. A method according to claim 10, which further comprises enabling said clients to view each said view separately.

25. A method according to claim 11, which further comprises enabling said clients to view each said view separately.

26. A method according to claim 10, which further comprises enabling said clients to explicitly delineate said common data.

27. A method according to claim 25, which further comprises enabling said clients to store said views as a bookmark associated with each said view.

28. A method according to claim 27, which further comprises enabling said clients to view said stored view by selecting a bookmark associated with said view.

29. A method according to claim 28, which further comprises enabling several said bookmarks to share a window such that only one said bookmark can be presented as its expanded view through the window at any time.

* * * * *